Dec. 25, 1934.   L. SAMEL   1,985,263
LIQUID COOLING APPARATUS
Filed Nov. 3, 1933   2 Sheets-Sheet 1
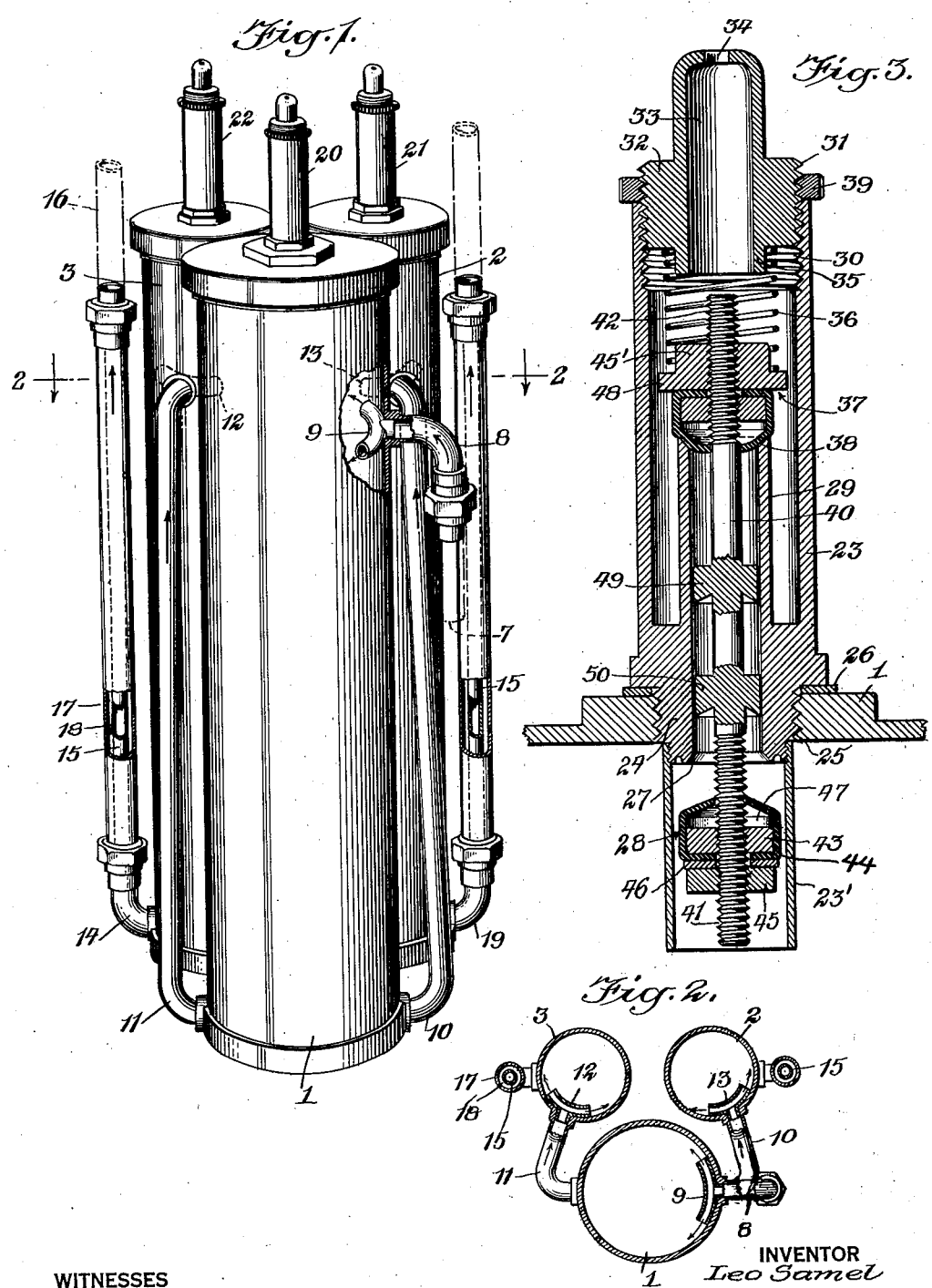
INVENTOR
Leo Samel Dec. 25, 1934.  L. SAMEL  1,985,263
LIQUID COOLING APPARATUS
Filed Nov. 3, 1933  2 Sheets-Sheet 2

Patented Dec. 25, 1934

1,985,263

UNITED STATES PATENT OFFICE 1,985,263

LIQUID COOLING APPARATUS

Leo Samel, Irvington, N. J.

REISSUED

Application November 3, 1933, Serial No. 696,582

9 Claims. (Cl. 225—40)

This invention relates to a liquid cooling apparatus, and has for an object to provide an improved construction wherein a large volume of liquid may be quickly cooled.

Another object of the invention is to provide a liquid cooling apparatus wherein the device is maintained sealed against normal entrance of air.

A further object of the present invention is to provide a cooling apparatus especially adapted for cooling beer and for maintaining the beer under pressure during the cooling action.

An additional object is to provide a cooling apparatus for beer wherein the parts are so formed that the entering beer will be maintained in a liquid state as it enters and the gases formed afterwards will be allowed to escape from time to time through a specially constructed valve.

In the accompanying drawings—

Figure 1 is a perspective view of a cooling apparatus disclosing an embodiment of the invention, certain parts being broken away for illustrating certain detailed features of the device;

Figure 2 is a sectional view through Figure 1 approximately on the line 2—2, the same being on a reduced scale;

Figure 3 is a vertical sectional view through one of the valves shown in Figure 1, the same being on a greatly enlarged scale;

Figure 4:
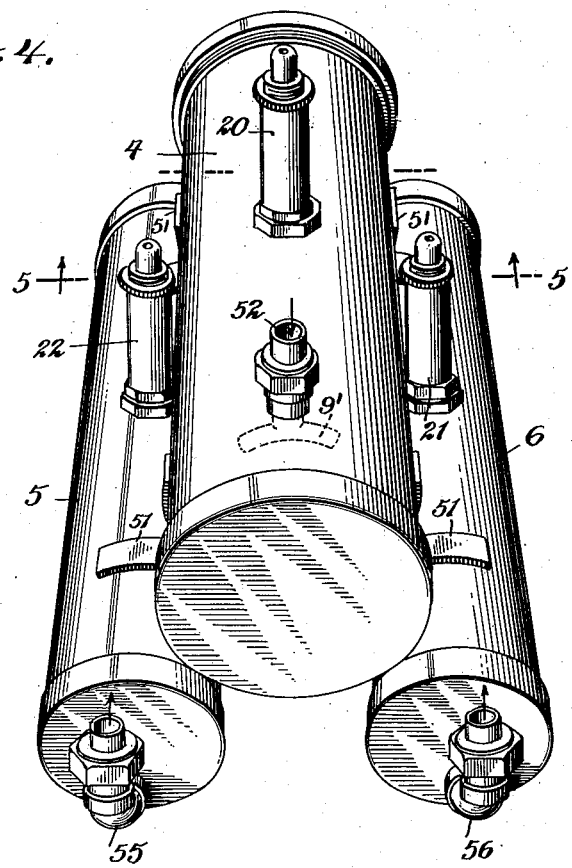
Figure 4 is a perspective view of a cooling apparatus disclosing a slightly modified structure to that illustrated in Figure 1, and illustrating how the inventive idea may be applied to containers arranged horizontally instead of vertically.

Referring to the accompanying drawings by numerals, 1, 2 and 3 indicate cooling tanks or containers. These tanks as shown in Figure 1 are arranged vertically. The same general idea is shown in the embodiment disclosed in Figure 4, wherein the tanks 4, 5 and 6 are arranged horizontally.

As illustrated in Figure 1 the tanks are arranged in a unit and are positioned as close together as is reasonably possible. This grouping of the containers is adapted to contain a comparatively large quantity of liquid as, for instance, beer. The entire structure as shown in Figure 1 is preferably submerged in water and ice so that all parts will be subjected to the cooling action of the water and ice. It is, of course, understood that the device could be arranged in a space chilled by other cooling mediums without departing from the spirit of the invention. As an instance, the device could be positioned in some form of gas or electric refrigerator and the same desirable results secured.

As illustrated a supply pipe 7 is used, the same extending preferably downwardly to a tank of beer or other liquid to be cooled. Where beer is to be cooled the barrel or keg is usually arranged in the cellar of the building while the unit consisting of the containers 1, 2 and 3 is arranged very near the place where the beer is to be dispensed. The gaseous pressure in the beer causes the beer to flow upwardly through pipe 7, thence through pipe 8 to the discharge member 9 which is interior of the tank 1 and near the upper part thereof. As shown, the discharge member 9 is an arc-shaped tubular member which discharges the liquid in an opposite direction substantially parallel with the sides of the container 1. By this structure the beer is not projected violently against the opposite wall but gently flows in a sheet around the walls and downwardly when the container is first being filled. When the container is filled the entering beer flows gently around along the wall and mixes with the beer already in the container without producing any agitation, thus retaining the gases in the natural state in the beer.

Where beer is being cooled the gas in the beer will naturally and automatically force the same upwardly from the barrel into the container 1. However, where the barrel or keg is some little distance off and below the container 1 it may be necessary to apply air pressure to the barrel to force the beer upward into the container 1. However, as far as the present invention is concerned the beer may be directed through the pipe 7 by any desired means and will be discharged into the container 1. As soon as this container is filled the beer will pass from the bottom thereof, through pipes 10 and 11, to the discharge members 12 and 13 fitted interiorly of the tanks 2 and 3 and functioning simultaneously to the discharge member 9. It will be noted that the liquid in all the tanks is discharged into the tank near the upper end but not exactly at the upper end. After the tanks have been filled there is naturally a pressure maintained thereon whether the contents is beer or some other liquid. This pressure is necessary in order that the liquid may flow out through the fitting 14 and upwardly through the comparatively small pipe 15 to the vending pipe 16. Pipe 16 is preferably very short and extends to a spigot or valve at a convenient point whereby the beer or other liquid may be drawn off readily while in chilled condition.

From Figure 1 it will be noted pipe 15 is arranged interiorly of pipe 17, which latter pipe acts as a protection against the ice and other matter and also provides a still air chamber 18 which with pipe 17 presents a heat insulating structure. Tank 2 is provided with a pipe 15 in a similar manner to tank 3 so that both these tanks function in the same way and liquid is adapted to be drawn off from either or both tanks simultaneously. If for any reason it should be so desired, instead of having pipe 15 arranged interiorly of tank 2, the fitting 19 could be connected by a suitable pipe to the fitting 14 so that all of the liquid would be drawn off through one pipe, namely, pipe 15 of tank 3. The intention is to fill all the tanks with the beer or other liquid and not draw off any until the liquid in all the tanks has been chilled to the desired extent. After this occurs the liquid may be drawn off from time to time from tanks 2 and 3 and as fast as it is drawn off new liquid will flow through the discharge member 9 into tank 1, and the liquid from the bottom of member 1 will flow automatically into tanks 2 and 3 to take the place of the liquid withdrawn therefrom. It will therefore be observed that in every instance the liquid is discharged into the respective tanks near the top and is drawn out near the bottom, so that in each instance the liquid leaving the particular tank is the coldest liquid in that tank. The comparatively warm beer entering tank 1 at the top will be chilled and gradually cooled by the time it reaches the bottom, and the same is true of the other tanks, namely, the liquid entering the upper part thereof will be further cooled and chilled so that it will be coldest by the time it reaches the discharge fittings 14 and 19.

In order that the device may function as just described and at the same time release some of the original air in the tanks, and in addition the air or gases formed therein, there are provided the valves 20, 21 and 22 for the respective tanks. These valves are all of identical construction. The detailed structure of one of these valves is shown in Figure 3, to which reference is made.

As illustrated in Figure 3 there is provided a casing 23 which has an integral extension 24 formed with threads 25 whereby it may be screwed into a cap on upper end of tank 1. A gasket 26 is used to insure a tight connection. The extension 24 is provided with a tapering valve seat 27 to be used in connection with the valve 28 as hereinafter more fully described. A tubular member 29 is either formed integral with the casing 23 or welded or otherwise rigidly secured thereto, said tubular member extending upwardly about half the length of the casing 23, though it could be longer or shorter as desired. Arranged at the upper end of the casing 23 are threads 30 which coact with the threads 31 on the closure 32, said closure having a bore 33 extending entirely therethrough but restricted at 34. An extension 35 is also formed on the closure 32 so as to center and hold in place the spring 36 which rests against the closure 32 and against the valve structure 37 for holding the same against the seat 38 formed on the upper end of the tube 29. A lock nut 39 is screwed on to the threads 31 and acts to lock the closure member 32 against accidental removal. Whenever desired this nut can be loosened and the closure screwed inwardly or outwardly for varying the tension of the spring 36. When this has been done the lock nut is again tightened so that the parts will not accidentally shift. A rod 40 is arranged so as to extend entirely through the tube 29, the base of the casing 23 and extension 24 whereby it will extend above and below these respective members. This rod is provided with threaded sections 41 and 42, section 41 carrying the valve structure 28 which consists of nut 43 carrying a rubber, leather or other member 44. The bottom of member 44 is clamped against the nut 43 by a nut 45, a suitable washer 46 transmitting the strain. It will be noted that the member 44 is provided with a chamber or hollow portion 47 above the nut 43. This allows a motion or resilient action when the valve member presses against the seat 27. In connection with the threaded ends 42 the valve member 37 is of identical structure with valve member 38 except that the nut 45' is provided with a flange 48 to accommodate the lower end of spring 36, whereby this spring has a continuous tendency to hold the parts shown in Figure 3, namely, with the valve member 37 pressing against the seat 38. Pistons 49 and 50 are carried by the rod 40 and preferably formed integral therewith. These pistons provide a sliding contact with the walls of pipe 29 and associated parts. There is enough clearness, however, to permit air and gas to flow in a limited amount.

With the valve constructed as just described and one provided for each of the containers or tanks shown in Figure 1 the device is in condition for use. When first used the various containers are naturally filled with air and as the beer enters as heretofore described the air will be brought under pressure more and more, the pressure being caused by the entrance of the beer and the expansion thereof. As gases liberated from the beer enter the upper part of the containers the air is compressed more and more and eventually the pressure will be such that the air and gases passing the pistons 49 and 50 will act on the valve member 37 and gradually raise the same against the action of the spring 36. At first the valve is merely raised a very short distance but as the pressure in the various containers increases and the level of the liquid increases the air pressure will increase. This air pressure will gradually raise valve 37 more and more and as it raises valve 37, valve 28 is also raised. This action continues until substantially all of the air has been exhausted from the containers. When this happens the valve 28 is pressing against the seat 27 and any added pressure caused by the incoming beer will merely cause valve 28 to press more tightly against seat 27, thus producing a seal with usually a small amount of gas at the upper end of each tank. The pressure of this gas causes a counter-pressure to the incoming beer and by reason of this pressure the incoming beer is maintained substantially constant. Whenever a quantity of the liquid is drawn off the result will naturally be a reduction in the pressure in the various containers and, consequently, a slight liberation of gases. This results in permitting the spring 36 to lower valve 28 slightly but only for a very short time. During this short period a desired portion of the gases produced will be vented and the increase in pressure produced by the incoming liquid will again seat valve 28 firmly. It will be understood that the valve is opened and closed very rapidly so that there is just a small discharge of gas. This automatic opening and closing of the valve takes place upon each operation of drawing off a supply of beer, such as a glassful. In this way all the gases formed by the reduction in pressure through the drawing off of a supply of liquid is taken care of so that the beer in the various containers will be substantially all in a liquid state. This is very desirable where the device is to be left for any length of time as, for instance, over Sunday. In most places beer is not dispensed on Sundays and the beer would naturally be allowed to remain in the various containers ready to be used on Monday. If the various containers were open to the atmosphere the result would be a releasing of the gases in the beer whereby the beer would be flat and unsaleable on Monday morning. By maintaining a counter-pressure of gas sufficient to keep the valves closed, the natural gases in the beer in the various containers are prevented from escaping and, consequently, the beer may remain one or many days in the containers and retain its proper condition ready for consumption.

From Figure 3 it will be noted that there is provided a protecting sleeve or casing 23' which is held in position by any suitable means as, for instance, by the thread at the upper end. This protecting casing is sufficiently large to permit the gases to readily pass back and forth so that the valve will function in the manner set forth and yet the valve member 28 and associated parts will be protected against accidental breakage.

Figure 5:
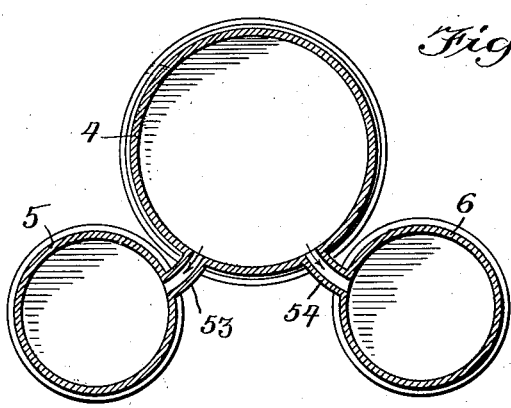
Figure 5 is a sectional view through Figure 4 approximately on the line 5—5.

Referring to Figures 4 and 5 it will be seen that the same inventive idea is present, but the containers are arranged horizontally instead of vertically. In this form of the invention the respective valves 20, 21 and 22 are arranged preferably substantially central at the highest point of each container so as to release the gases as heretofore mentioned in respect to the preferred form. The containers may be connected together in assembled position in any desired manner as, for instance, by a suitable saddle 51 which may be welded, soldered or otherwise secured to the respective containers. The container 4 is provided with an inlet pipe 52 which is adapted to be connected to a supply of liquid, for instance, a barrel or keg of beer. The pipe 52 discharges through a suitable discharge member 9' similar to member 9. However, instead of having the containers as shown in Figure 1, inclined tubular members 53 and 54 are provided as shown in Figure 5, wherein the liquid from the lowest part of container 4 enters the other containers at a point appreciably above the bottom. The outlet fittings 55 and 56 of the lower containers take liquid from the lowermost point of the lower containers, so that the circulation or movement of the beer in this form of the invention is the same as in the preferred form, namely, from the top of the respective containers downwardly, with the coldest liquid from container 4 entering the upper part of the lower containers, and in turn the coldest liquid from the lower containers passing to the discharge point.

In the accompanying drawings one primary container and two auxiliary containers have been shown, but if desired a greater or less number of containers could be used without departing from the spirit of the invention. In all forms of the invention the relief valve shown in Figure 3 is utilized to relieve the respective containers of the air and gases when the beer first enters the containers, and later relieves any air or gases from time to time automatically as the liquid is drawn from the device.

I claim:

1. A liquid cooling apparatus comprising a main container, a plurality of auxiliary containers, means providing communication between the bottom of the main container and the top portion of the respective auxiliary containers, means for directing liquid into the main container, a pipe for directing liquid from the bottom of the auxiliary containers, a housing surrounding and spaced from said pipe, said housing acting in the double capacity of protecting means and insulating means, and a vent valve provided at the highest point in each of said containers.

2. A liquid cooling apparatus comprising a main container, a plurality of auxiliary containers, means providing communication between the respective containers, means providing outlets for the auxiliary containers, a valve structure carried by the upper part of each container acting as an air vent, said valve structure including a double acting valve member, a tubular structure coacting with said double acting valve member, and a spring for normally holding one end of the double acting valve member against one end of the tubular structure whereby air and gas cannot escape until the pressure has overcome the action of said spring, said double acting valve member moving upwardly against the action of the spring as the pressure increases until the lower end thereof engages said tubular structure.

3. A liquid cooling apparatus including a main container, an auxiliary container, a pipe leading from the bottom of the main container to a point adjacent the top of the auxiliary container, said pipe at the upper end being formed with a discharge structure for discharging liquid below and along the walls of the auxiliary container, an outlet member connected to the bottom of said auxiliary container, an inlet member for directing liquid to the main container near the top thereof, said inlet member having a discharge structure acting to discharge the liquid in opposite directions substantially parallel with the walls of the container, and an air vent structure at the highest point of both of said containers for venting the air therefrom, each of said venting structures including a double end valve formed with a spring for normally holding one end closed, said spring acting to hold said valve closed until overcome by the pressure in the container, said pressure acting to close the other end of the valve against the action of said spring.

4. A liquid cooling apparatus for beer and the like, including a main container, means for directing the liquid into the main container at the upper end thereof, an auxiliary container, means for directing liquid from the main container to the upper portion of the auxiliary container, an outlet connected with the lower end of said auxiliary container, and a vent valve for each container, each vent valve comprising a sliding valve structure having a valve near each end, a stationary tubular member positioned to be engaged by the valve members according to the position of the valve structure, and a spring for normally holding one of the valve members against one end of said tubular structure whereby air and gas in the respective containers are maintained therein until the pressure thereof is sufficient to overcome the action of said spring, whereupon said valve structure will be moved so as to allow the passage of air and gas through said tubular structure, said valve structure functioning to close the lower end of said tubular structure when the pressure in the container has reached a certain extent, said pressure being sufficient to completely overcome the action of said spring.

5. A liquid cooling apparatus including a container having an inlet and an outlet, a vent valve for the container for venting air and gases therefrom, said vent valve including a casing screwed into the container so as to be in free communication therewith, a tubular member arranged within the casing with one end normally projecting into the container and the other into the casing, a rod extending through said tubular structure, a pair of spaced pistons carried by said rod and loosely fitting said tubular structure so that air and gas may escape by the pistons in limited quantities, a valve member at each end of said rod, said valve members being spaced apart so that when the upper valve member is resting on said tubular structure the lower valve member will be spaced an appreciable distance therefrom, a spring acting on the upper valve member and normally maintaining the same seated, an adjustable structure carried by the casing for regulating the tension of said spring.

6. A liquid cooling apparatus including a container and a vent valve therefor, said vent valve having an inner and an outer valve seat, said inner valve seat projecting into the container and said outer valve seat being positioned exterior of the container, a rod extending through the valve seats, a valve member positioned on said rod near each end thereof, and a spring normally causing one of the valve members to engage said outer valve seat, said spring acting against any air and gas within said container.

7. A cooling device for liquids including a container and a vent structure therefor, said vent structure including a tubular member extending into said container, a rod extending through said tubular member, means for guiding said rod so as to hold the same centrally of said tubular member, said means permitting air and gas to pass in limited quantities, a valve structure secured to said rod at each end thereof, each of said valve structures including a pair of clamping members and a rubber casing formed to collapse to a greater or less extent as the valve member is forced against its seat.

8. In a cooling device of the character described, an air vent structure including a valve having a tubular portion with a seat, a rod extending through said tubular portion, a valve carried by said rod and formed with a hollow contact member capable of collapsing when pressed against said seat, and spring means for normally holding said contact member away from said seat.

9. A cooling device for effervescent liquids, including a container, means for directing liquid into the container near the top, means at the bottom of the container for directing liquid therefrom, a venting structure at the highest point in the container, said venting structure having a casing formed with a tubular member having one end extending into said container and the other end at an appreciable distance above the container, the respective ends of said tubular structure forming valve seats, a rod extending through said tubular structure formed with integral pistons having a limited clearance with the tubular structure, a valve member threaded on to each end of said rod, each of said valve members having a resilient face adapted to engage a seat adjacent thereto, and a spring acting on one of the valve members for normally holding the same against said seat, said spring being adapted to be overcome by the air pressure and gas in said container, the pressure in the container being adapted to become sufficiently strong to completely overcome said spring and seat the valve member at the opposite end of said rod whereby the liquid cannot escape from the container.

LEO SAMEL.